(12) United States Patent
Iriuchijima

(10) Patent No.: US 7,360,696 B2
(45) Date of Patent: Apr. 22, 2008

(54) DATA PRINTING METHOD USING A SMALL PRINTER AND A COMMODITY DATA REGISTER

(75) Inventor: Kazunari Iriuchijima, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 416 days.

(21) Appl. No.: 10/937,562

(22) Filed: Sep. 10, 2004

(65) Prior Publication Data

US 2005/0057775 A1 Mar. 17, 2005

(30) Foreign Application Priority Data

Sep. 12, 2003 (JP) ............................. 2003-321765

(51) Int. Cl.
*G06K 15/00* (2006.01)

(52) U.S. Cl. ...................... 235/383; 283/61.1; 283/108

(58) Field of Classification Search ................ 235/383, 235/385, 378; 283/60.1, 93, 108
See application file for complete search history.

(56) References Cited

U.S. PATENT DOCUMENTS

| | | | | |
|---|---|---|---|---|
| 5,375,886 A | * | 12/1994 | Tsuchiya | 283/93 |
| 5,853,197 A | * | 12/1998 | Mowry et al. | 283/93 |
| 5,984,364 A | * | 11/1999 | Diamond | 283/67 |
| 6,030,000 A | * | 2/2000 | Diamond | 283/58 |
| 6,515,755 B1 | * | 2/2003 | Hasegawa | 358/1.14 |
| 6,692,030 B1 | * | 2/2004 | Phillips | 283/91 |

FOREIGN PATENT DOCUMENTS

JP HEI 10-143764 5/1998

\* cited by examiner

*Primary Examiner*—Daniel Stcyr
(74) *Attorney, Agent, or Firm*—Dickstein Shapiro LLP

(57) ABSTRACT

In a data printing method of printing a plurality of data items, each including a name of an object, on a print sheet by a printer which has a function for printing a plurality of types of meshing patterns, the method includes the step of printing the plurality of data items so that adjacent ones of the data items are covered with the meshing patterns different from each other.

11 Claims, 13 Drawing Sheets

```
                    LUMINO TOKYO
                   ORION RESTAURANT
                     LUNINE BLDG.
                      THANK YOU.
                   TEL (xxx) yyyy-zzzz
· · · · · · · · · · · · · · · · · · · · · · · · · · · ·
CASHIER: TAKATSU   REGISTER NO.2
03/3/22 (SAT) 11:15

SET A                                        ¥700
      CHINESE NOODLE
      FRIED RICE (HALF)
      SOUP
  PEKING DUCK                                  ¥850
  BEEF NOODLE                                  ¥400
  SUBTOTAL                                    ¥1950
  TOTAL                                       ¥1950
  DEPOSIT
      CASH                                    ¥2050
  CHANGE                                       ¥100
```

FIG. 1
PRIOR ART

```
                    KITCHEN ORDER
....................................

TABLE NO. 1
    CHINESE NOODLE  1
    FRIED RICE (HALF)  1
    SOUP  1
    PEKING DUCK  1
    BEEF NOODLE  1

TABLE NO. 2
    SPRING ROLL  1
    BEER  2
    EGG  1

TABLE NO. 3
    SEAFOOD NOODLE  1
    ROAST DUCK NOODLE  1
    KING PRAWN NOODLE  1
```

FIG. 2
PRIOR ART

LUMINO TOKYO
ORION RESTAURANT
LUMINE BLDG.
THANK YOU.
TEL (xxx) yyyy-zzzz

· · · · · · · · · · · · · · · · · · · · · · · · · · · · · · ·

CASHIER: TAKATSU   REGISTER NO.2

03/3/22 (SAT) 11:15

SET A                                           ¥700

~~CHINESE NOODLE FRIED RICE (HALF) SOUP~~

PEKING DUCK                                     ¥850

BEEF NOODLE                                     ¥400

~~SUBTOTAL                                     ¥1950~~

~~TOTAL                                        ¥1950~~

DEPOSIT
     CASH                                      ¥2050

~~CHANGE                                        ¥100~~

KITCHEN ORDER

. . . . . . . . . . . . . . . . . . . . . . . . . . . . . . . . . . . . . .

TABLE NO. 1

CHINESE NOODLE 1  FRIED RICE (HALF) 1  SOUP 1
PEKING DUCK 1  BEEF NOODLE 1

TABLE NO. 2

SPRING ROLL 1  BEER 2  EGG 1

TABLE NO. 3

SEAFOOD NOODLE 1  ROAST DUCK NOODLE 1
KING PRAWN NOODLE 1

FIG. 4

| COMMODITY DATA TABLE | | | |
|---|---|---|---|
| COMMODITY CODE | COMMODITY NAME | UNIT PRICE | OTHER INFORMATION |
| 00000001 | SET A<br>CHINESE NOODLE<br>FRIED RICE (HALF)<br>SOUP | AAAA | |
| 10000001 | CHINESE NOODLE | AAA | |
| 10000002 | SEAFOOD NOODLE | AAB | |
| 10000003 | BEEF NOODLE | AAC | |
| 10000004 | ROADT DUCK NOODLE | AAD | |
| 10000005 | KING PRAWN NOODLE | AAE | |
| 20000001 | FRIED RICE | BAA | |
| 20000002 | WONTON SOOP | CAA | |
| 20000003 | PEKING DUCK | BAB | |
| 20000004 | SPRING ROLL | CAB | |
| 30000001 | BEER | DAA | |
| 30000002 | EGG | AB | |

FIG. 8

```
             LUMINO TOKYO
           ORION RESTAURANT
              LUMINE BLDG.
              THANK YOU.
           TEL (xxx) yyyy-zzzz
  . . . . . . . . . . . . . . . . . . . . . . . . . . .

CASHIER: TAKATSU   REGISTER NO.2
  03/3/22 (SAT) 11:15
```

SET A ¥700

CHINESE NOODLE

FRIED RICE (HALF)

SOUP

PEKING DUCK ¥850

BEEF NOODLE ¥400

SUBTOTAL ¥1950

TOTAL ¥1950

DEPOSIT

CASH ¥2050

CHANGE ¥100

LUMINO TOKYO
ORION RESTAURANT
LUMINE BLDG.
THANK YOU.
TEL (xxx) yyyy-zzzz

. . . . . . . . . . . . . . . . . . . . . . . . . . . . .

CASHIER: TAKATSU   REGISTER NO.2
03/3/22 (SAT) 11:15

~~SET A~~ ~~¥700~~
CHINESE NOODLE
~~FRIED RICE (HALF)~~
SOUP
PEKING DUCK ¥850
BEEF NOODLE ¥400
SUBTOTAL ¥1950
TOTAL ¥1950
DEPOSIT
CASH ¥2050
~~CHANGE~~ ~~¥100~~

FIG. 13

DATA PRINTING METHOD USING A SMALL PRINTER AND A COMMODITY DATA REGISTER

This application claims priority to prior Japanese application JP 2003-321765, the disclosure of which is incorporated herein by reference.

BACKGROUND OF THE INVENTION

This invention relates to a data printing method of printing data using a small printer on a print sheet and, in particular, to a data printing method capable of facilitating classification and identification of data items and reducing a printing cost. This invention also relates to a commodity data register using the data printing method.

In sales and service industry, a commodity data register is widely used in shops, restaurants, and so on. Typically, the commodity data register uses a small printer adapted to print commodity data on a print sheet having a narrow width, for example, 58 mm. On the print sheet having such a narrow width, only a limited number of characters can be printed. Specifically, the print sheet having the width of 58 mm allows 34 characters each having a width of 12 bits to be printed per line. In an existing data printing method using a small printer, line separation or paragraph separation is used so that the commodity data printed on the print sheet can easily be recognized.

For example, the print sheet may be a receipt used in a shop to confirm a commodity item and the quantity and the price of the commodity item upon purchasing the commodity item. Alternatively, the print sheet may be a kitchen order sheet (hereinafter simply called a kitchen sheet) used in a restaurant and issued to a cook to inform a customer's order printed thereon.

In the data printing method using a small printer, it is important to allow easy recognition of, for example, a commodity name printed on the print sheet in order to reduce an error in business operations. On the other hand, as for the small printer, monochromic printing is a mainstream. Therefore, in practical use, individual commodity items are printed in different or separate lines, respectively.

For example, in a receipt 1 illustrated in FIG. 1, individual commodity items are printed in separate lines, respectively. For a commodity set without unit prices for individual items, line separation and paragraph indentation are used in combination. Thus, the commodity items are easy to recognize. On the other hand, it is necessary for a customer who purchases the commodity items as purchased items to classify and exactly know the purchased items in order to control a budget. However, in case where a large number of commodity items are simultaneously purchased, the number of lines printed on the receipt is great. For example, in family budget management, an operation of recording the purchased items in an account book requires a troublesome work and suffers easy occurrence of error because commodity classifications, such as daily-use articles and food articles, are not shown on the receipt.

Similarly, in a kitchen sheet 2 illustrated in FIG. 2, separate paragraphs correspond to different table numbers, respectively, to help easy recognition of commodity names. However, the kitchen sheet 2 lacks any classification by ingredients or recipes, which would be convenient for the cook, and is therefore inconvenient.

Thus, each of the receipt 1 illustrated in FIG. 1 and the kitchen sheet 2 illustrated in FIG. 2 has no commodity classification and requires manual operation in sorting the commodity items. This results in easy occurrence of error.

In view of the above, proposal has been made of a commodity sales data registration processor comprising a color printer as a small printer for printing commodity data using different colors assigned to commodity classifications, respectively (see Japanese Patent Application Publication (JP-A) No. H10-143764).

However, in the above-mentioned proposal also, only a limited number of characters are printed on the receipt or the kitchen sheet having a limited width. Even if line separation or paragraph separation is used, a long commodity name may not be printed within a single line. In this event, the commodity name is inevitably abbreviated. Further, the color printer which is expensive must be used to sort the items.

As described above, the commodity names are printed on the print sheet of a limited width line by line. Some of the commodity names in a same group or classification may be printed using paragraph indentation. If the commodity name is long, the commodity name may be printed in two lines or may be abbreviated. In this event, it is difficult to identify or confirm the commodity name.

As one approach, the commodity names may be distinguished by color information. In this case, however, a printing cost is high because the color printer and a multi-color ink are required.

On the other hand, in case where short commodity names are consecutively printed line after line, a large blank space is uselessly left on the print sheet. In this event, consumption of the print sheet is increased and a running cost is elevated.

SUMMARY OF THE INVENTION

It is an object of this invention to provide a data printing method which enables commodity names printed on a print sheet of a limited width to be easily identified and confirmed by the use of a monochromic printer and which is therefore capable of reducing a printing cost.

It is another object of this invention to provide a data printing method which enables commodity names printed on a print sheet of a limited width to be easily identified and confirmed even if a plurality of commodity names are continuously printed in a same line and which is therefore capable of saving consumption of a print sheet.

It is still another object of this invention to provide a commodity data printer using the above-mentioned data printing method.

In a method according to this invention, a small printer has a function of printing a wide variety of monochromic meshing patterns. Upon printing data on a print sheet, adjacent ones of data items are printed with meshing patterns different from each other in accordance with a predetermined rule. In other words, the meshing patterns are different in type between adjacent ones of data items.

Thus, in order to facilitate identification of data items printed on a print sheet, the meshing patterns are used instead of color information. Therefore, an expensive color printer is unnecessary.

By printing adjacent ones of data items with meshing patterns different from each other, a plurality of data items forming a group can be continuously printed within the same line (without changing lines) over a plurality of lines. Thus, consumption of the print sheet can be saved to thereby reduce a running cost. In addition, even the data items are continuously printed in the same line, the data items can easily be distinguished. Printing with meshing patterns may be performed every other line according to a predetermined rule.

Further, if a color printer capable of carrying out polychromic printing is used as the small printer, the data can be printed by the use of meshing patterns and color information in combination. Further, background colors may be changed, for example, line by line. Thus, not only the individual data items but also classification of data groups can easily be recognized.

A specific commodity data register using the above-mentioned method comprises a small printer for printing commodity data, including a commodity name and an attribute of a commodity item, on a print sheet having a limited width. The commodity data register comprises a data input section, a commodity data table, an order entry data table, a processing program storing section, and a control section connected to the small printer, the data input section, the commodity data table, the order entry data table, and the processing program storing section.

The small printer is adapted to print a wide variety of meshing patterns in a monochromic mode or a polychromic mode. The data input section is adapted to enter the commodity name and the attribute of each commodity item as the commodity data. The commodity data table serves to preliminarily record and store a commodity code, a commodity name, and a unit price of each commodity item to be handled. The order entry data table records and stores a customer number, the commodity name and the quantity of each commodity item, and a total price on the basis of the commodity data entered through the data input section. The processing program storing section preliminarily sets a meshing pattern rule corresponding to the order of printing the commodity data and preliminarily registers and stores a printing procedure per type of the print sheet.

The control section is connected to the small printer, the data input section, the commodity data table, the order entry data table, and the processing program storing section. Supplied from the data input section with the customer number, the commodity code and the quantity of each commodity item, the control section refers to the commodity data table to read the commodity name and the unit price, calculates the total price, and makes the order entry data table record and store the commodity data as order entry data (order entry data storing operation). Supplied with a printout request from the data input section with the customer number, the control section acquires from the order entry data table the commodity data corresponding to the customer number and requests the small printer to print the commodity data with meshing patterns according to the predetermined rule (printout requesting operation). When the small printer prints the commodity data by the printout requesting operation, adjacent ones of data items are printed with meshing patterns different from each other in accordance with the predetermined rule.

The data printing method using a small printer according to this invention is advantageous in that the printing cost can be saved because the data are printed by a monochromic printer using meshing patterns different between adjacent ones of data items without requiring a color printer and a polychromic ink. Further, for a group of commodity items, a plurality of data items corresponding thereto can be continuously printed in the same line in an indented paragraph with different meshing patterns. Therefore, it is possible to reduce the number of printed lines and the length of the print sheet required. Thus, the printing cost is further decreased.

If the color printer is used, the cost reduction is restricted to saving of consumption of the print sheet. However, by the use of polychromic printing in combination with the meshing patterns, the individual data items and the classification can more easily be distinguished.

BRIEF DESCRIPTION OF THE DRAWINGS

FIG. 1 is a view showing a receipt according to a known printing technique using a small printer;

FIG. 2 is a view showing a kitchen sheet according to a known printing technique using a small printer;

FIG. 3 is a view showing a receipt according to a first embodiment of this invention;

FIG. 4 is a view showing a kitchen sheet according to a second embodiment of this invention;

FIG. 8 is a view showing a commodity data table illustrated in FIG. 7;

FIG. 13 is a view showing a receipt according to a sixth embodiment of this invention.

DESCRIPTION OF THE PREFERRED EMBODIMENTS

Figure 5:
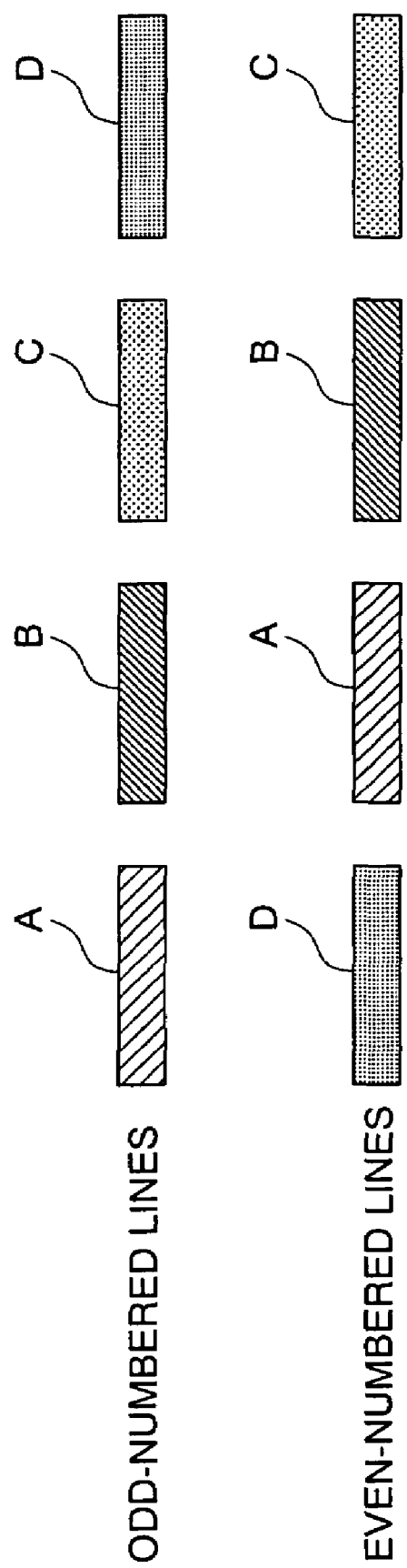
FIG. 5 is a view showing various types of meshing patterns and the order of printing.

Now, description will be made of this invention with reference to the drawing. In the following, description is directed to commodity data in a restaurant. However, this invention is also applicable to other various commodity data.

In case where commodity names are printed on a print sheet having a limited width line after line with paragraph indentation used for those commodity names belonging to a particular group or classification, it is inevitable that a long commodity name is printed over a plurality of lines or abbreviated. In this event, it is difficult to distinguish and confirm the individual commodity names. Further, in order to distinguish the commodity names by the use of color information, a color printer and a polychromic ink are required so that the printing cost can not be reduced. In order to remove the above-mentioned disadvantages, a small printer having means for printing a wide variety of meshing patterns in a monochromic mode is used in this invention. Upon printing commodity data on a print sheet, adjacent ones of data items are printed with meshing patterns different from each other in accordance with a predetermined rule.

First Embodiment

Referring to FIG. 3, a first embodiment of this invention will be described.

Referring to FIG. 3, a receipt 3 is prepared in a restaurant upon payment. The receipt 3 is prepared from a customer's order already entered and shows a table number as a customer number.

The order received by a waiter is recorded as commodity data including a commodity name and a quantity of each commodity item in correspondence to the table number. In FIG. 3, commodity names of a plurality of commodity items grouped into a commodity set such as a set meal and having no unit prices are printed continuously in a single paragraph without line feed by the use of different meshing patterns so as to facilitate distinguishment between adjacent ones of the commodity items from each other. In FIG. 3, lines of a subtotal, a total, and a change are printed with meshing patterns so as to easily confirm the detail of the payment and to reduce the number of printed lines.

The above-mentioned arrangement of paragraphs and meshing patterns is preliminarily prepared in a processing program for the printer.

Second Embodiment

Referring to FIGS. 4 and 5, a second embodiment of this invention will be described.

FIG. 4 shows a kitchen sheet (kitchen order sheet) 4 prepared in a restaurant upon requesting cooking to a kitchen. The kitchen sheet 4 is prepared from a customer's order already entered and shows a table number as a customer number.

The order received by a waiter is recorded as commodity data including a commodity name and a quantity of each commodity item in correspondence to the table number. In FIG. 4, the commodity names and the quantities of the commodity items per table, similar to those in FIG. 2, are continuously and collectively printed without line feed with meshing patterns different from one another so as to facilitate distinguishment between adjacent ones.

Referring to FIG. 5, types of meshing patterns may be changed line by line in case of collective printing over two or more lines. In FIG. 5, four types of meshing patterns A, B, C, and D are used in this order in a first line while the meshing patterns D, A, B, and C are used in this order in a second line. Thus, in adjacent lines, the meshing patterns appear in different manners.

In the kitchen sheet illustrated in the figure, the commodity names and the quantities of the commodity items as commodity data are continuously printed per table number without line feed and the length of the print sheet is shortened. Since adjacent ones of the commodity items are printed with different types of meshing patterns, the commodity items are easily distinguished. In addition, since the commodity items per table number are collectively recognized, it is easy to take care so that those commodities per table number are completed and served at the same time.

The above-mentioned arrangement of paragraphs and meshing patterns is preliminarily prepared in a processing program for the printer.

Third Embodiment

Figure 6:
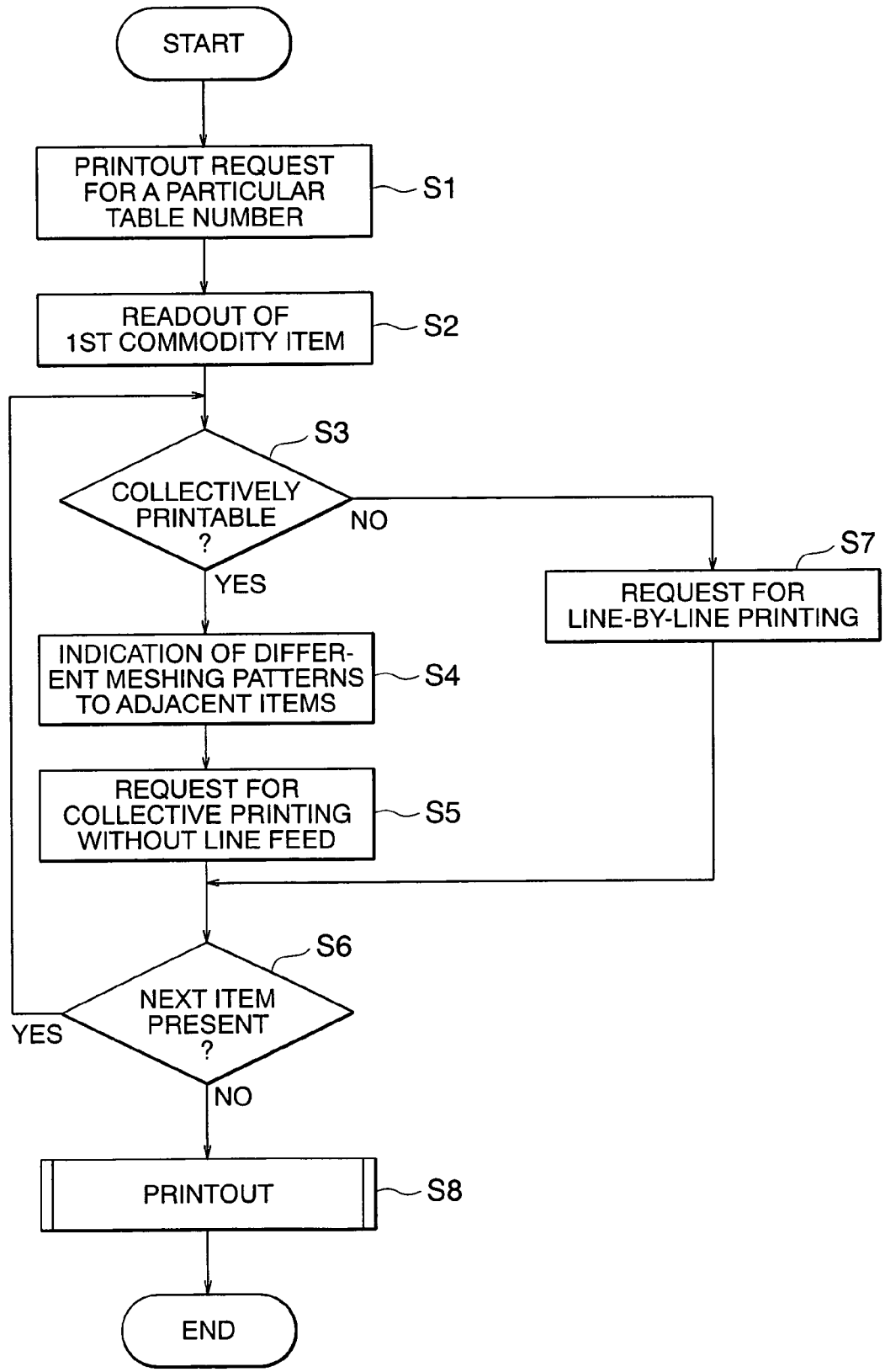
FIG. 6 is a flow chart for describing a data printing method using a small printer according to a third embodiment of this invention.

Referring to FIG. 6, a third embodiment of this invention will be described. The third embodiment is a procedure for realizing the first or the second embodiment.

Referring to FIG. 6, description will be made of an operation of printing the receipt 3 in the first embodiment and the kitchen sheet 4 in the second embodiment on the print sheet. In the restaurant, the customer number is given by the table number. In order to prepare the kitchen sheet or the receipt showing the content of the customer's order already entered when food preparation is requested or when payment is requested, the waiter enters a printout request for the content of the customer's order on a commodity data register (hereinafter simply called a register) in the following manner.

The order received by the waiter is recorded as the commodity data including the commodity name and the quantity of each commodity item in correspondence to the table number. For example, the commodity names of the commodity items grouped into a commodity set such as a set meal and having no unit prices and the commodity names of the commodity items per table are collectively and continuously printed without line feed with different meshing patterns so that the adjacent ones of the commodity items are easily distinguished. In the following description, those commodity items adapted for collective and continuous printing will be referred to as collectively printable commodity items.

At first, the waiter operates the register to produce a printout request for a particular table number (step S1). Then, the register reads a commodity name of a first commodity item from commodity data corresponding to the particular table number (step S2). If the first commodity item is a collectively printable commodity item (YES in step S3), a meshing pattern is selected in accordance with a predetermined rule (for example, in the order as illustrated in FIG. 5) so that every adjacent ones of commodity data are printed with meshing patterns different from each other (step S4), and collective printing without line feed is requested (step S5).

If a next commodity item is present for the same table number (YES in step S6), the operation returns to the step S3 and the register repeats the above-mentioned steps.

If the first commodity item is not a collectively printable commodity item (NO in step S3), the register requests line-by-line printing (step S7) and the operation proceeds to the step S6.

In absence of a next commodity item for the same table number (NO in step S6), the small printer executes printing on a print sheet.

Fourth Embodiment

Referring to FIGS. 7 to 11, a fourth embodiment of this invention will be described.

Figure 7:
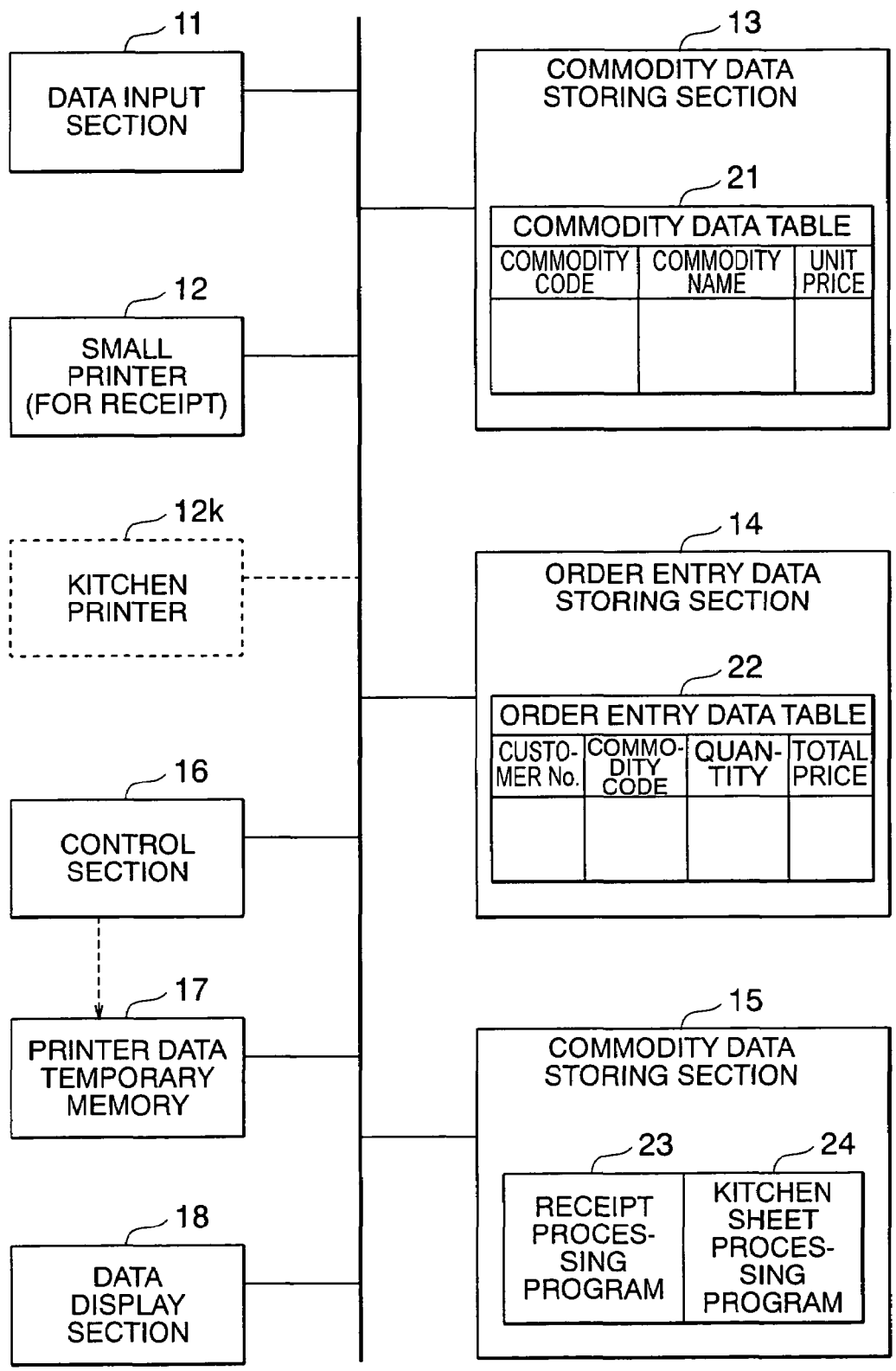
FIG. 7 is a view showing a commodity data register according to a fourth embodiment of this invention.

Referring to FIG. 7, the register (commodity data register) according to this invention will be described. For example, the register is installed at an entrance of a restaurant and generally comprises a data input section 11, a small printer 12, a commodity data storing section 13, an order entry data storing section 14, a processing program storing section 15, a control section 16, a printer data temporary memory 17, and a data display section 18. These components are connected to one another through a bus. The data input section 11, the small printer 12, the commodity data storing section 13, the order entry data storing section 14, the processing program storing section 15, and the data display section 18 are controlled by the control section 16 as a processor. Thus, the register is an information processing apparatus comprising a processor, a memory, and input and output devices.

The data input section 11 includes an input device, such as a keyboard, and a control unit for controlling the input device. When the waiter receives a customer's order and enters a commodity name of each commodity item, the data input section 11 converts the commodity name into a commodity code and sends the commodity code to the control section 16 together with the quantity of the commodity item entered next. At this time, a customer number is automatically entered, for example, as a serial number. In case of the restaurant, the data input section 11 may include a mobile terminal carried by the waiter and connected through wireless communication to the control section 16. When a customer is seated at a table, the order is entered by the mobile terminal using a table number as the customer number. Generally, the mobile terminal contains a conversion table for conversion between the commodity name and the commodity code. The commodity name entered by the waiter is converted into the commodity code to be sent to the control section 16.

For example, the small printer 12 is responsive to a request from the control section 16 and prints a receipt to the customer in a monochromic mode. The small printer 12 may print a kitchen sheet (an order sheet to a kitchen) which is delivered to the kitchen. In this embodiment, the kitchen is provided with a kitchen printer 12k which is supplied with commodity data via wireless communication and prints the kitchen sheet. Upon printing, the commodity data including the commodity name and the quantity of each commodity item are printed with meshing patterns item by item according to the request from the control section 16. In order to reduce the amount of the commodity data handled by the control section 16, a control unit of the printer is provided with a converter for converting the commodity code into character codes before printing. Upon reception of a commodity code of a set meal, the kitchen printer 12k prints commodity names of commodity items in the set meal and their quantities as illustrated in FIG. 4.

The commodity data storing section 13 has a commodity data table 21 preliminarily recording and storing a commodity name, a unit price, and so on for each commodity code. Every time when input information is supplied from the data input section 11, the order entry data storing section 14 records, under control of the control section 16, the commodity code, the quantity, and the total price corresponding to the quantity for each customer number with reference to storage information in the commodity data table 21. The processing program storing section 15 preliminarily stores programs to be executed by the control section 16. In case of printout at the restaurant, a receipt processing program 23 and a kitchen sheet processing program 24 are provided.

The control section 16 is a processor and executes functions of the register by the use of the processing programs stored in the processing program storing section 15. The operation will later be described with reference to FIGS. 9 through 11.

The data display section 18 is one of output devices as well as the small printer 12 and may be included in the mobile terminal carried by the waiter and having the data input section 11.

Referring to FIG. 8, the commodity data table 21 will be described.

The commodity data table 21 illustrated in the figure preliminarily records the commodity code, the commodity name, the unit price, and so on. As shown in the figure, the commodity name and the unit price are associated with each commodity code. The commodity set can be identified by the commodity code. For the commodity code of the commodity set, commodity names of a plurality of commodity items (cooked food in this example) as components of the commodity set and a set price are recorded without individual commodity codes and unit prices. The commodity name in the commodity data table is recorded by character codes to be printed by the small printer 12 or to be displayed by the data display section 18. As described above, each of the data input device (the data input section 11) and the data output device (the small printer 12 and the data display section 18) is generally provided with a conversion table for conversion between the commodity name and the commodity code so as to reduce the amount of the commodity data handled by the control section 16.

In view of a memory capacity, the order entry data table 22 does not store character codes corresponding to the commodity name but stores the order entry data including the customer number, the commodity code, the quantity, and the total price which are coded by a combination of a serial number, symbols, and numerals. Although not shown in the figure, an additional memory region is provided to record whether or not a kitchen order has been made per commodity code and whether or not payment has been made per customer number. Therefore, even the same commodity item is treated as a different order after the kitchen order has been made.

The receipt processing program 23 is used, for example, when the control section 16 executes output of the receipt 3 illustrated in FIG. 3. The kitchen sheet processing program 24 is used, for example, when the control section 16 executes output of the kitchen sheet 4 illustrated in FIG. 4. Further, for the receipt, processing of collecting the same commodity items after the kitchen order is contained as a processing program to be used by the control section 16.

Figure 9:
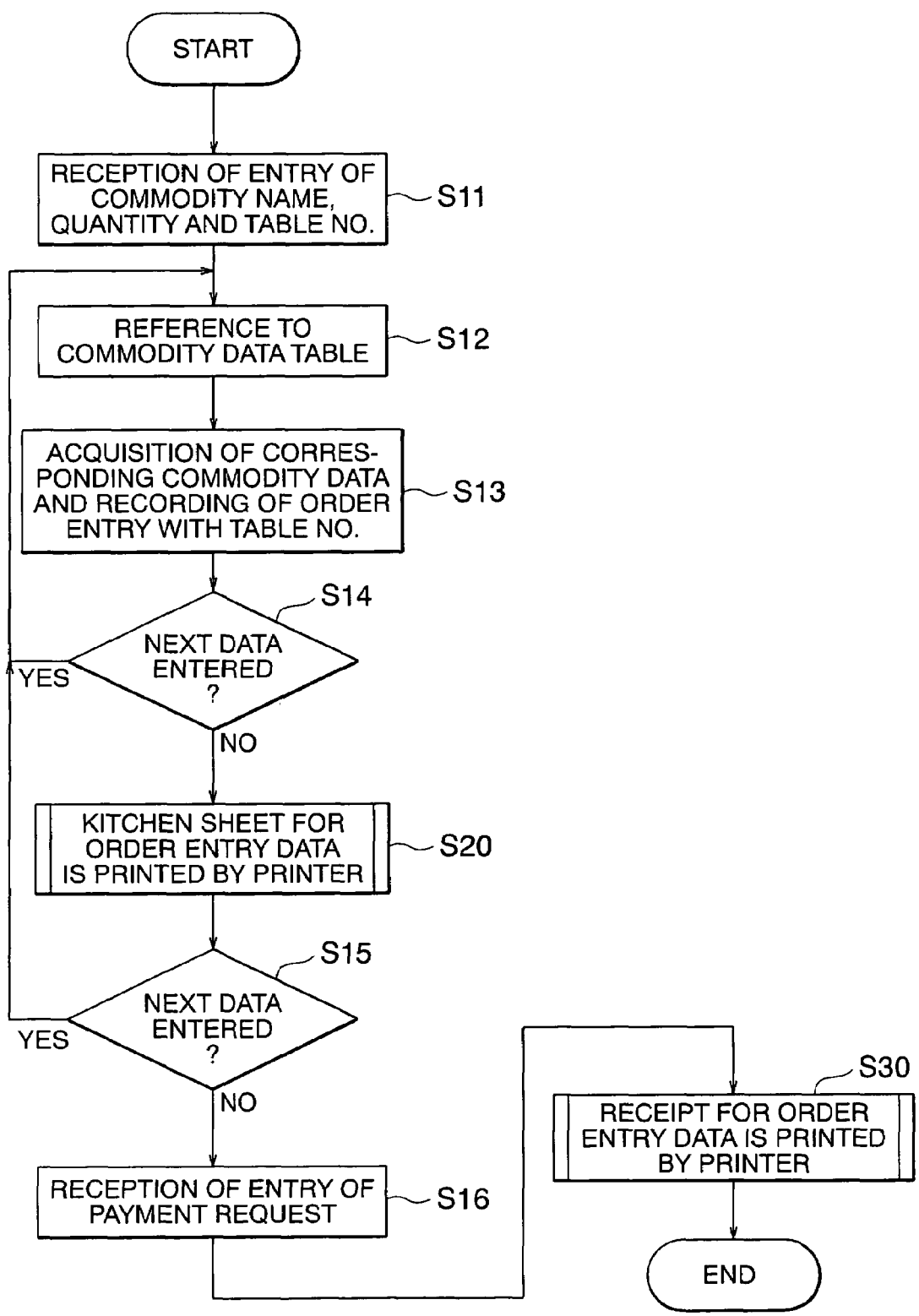
FIG. 9 is a flow chart for describing an operation of the commodity data register illustrated in FIG. 7.

Next referring to FIG. 9 together with FIG. 7, description will be made of an entire procedure when data are entered via the data input section 11 of the register (commodity data register) illustrated in FIG. 7.

At first, the data input section 11 of the register receives the table number entered by the waiter who receives an order from a customer at a table, the commodity code obtained by conversion from the commodity name, and the quantity (step S11) and sends the table number, the commodity code, and the quantity to the control section 16. The control section 16 refers to the commodity data table 21 by the commodity code (step S12) and reads a unit price corresponding to the commodity code. Then, the control section 16 makes the order entry data table 22 record order entry data including the table number as the customer number, the commodity code, the quantity, and the total price calculated from the quantity and the unit price (step S13).

In case where the data input section 11 receives next data according to the step S11 at that time instant (after the order entry data are recorded) (YES in step S14), the control section 16 acquires the next data and repeats the steps S12 to S14. If no next data are received (NO in step S14), the control section 16 makes the kitchen printer 12k print the kitchen sheet based on the order entry data in accordance with the kitchen sheet processing program 24 which will later be described with reference to FIG. 10 (step S20).

In case where the data input section 11 receives next data according to the step S11 at that time instant (after the kitchen sheet is printed) (YES in step S15), the control section 16 acquires the next data and repeats the steps S12 to S15. If no next data are received (NO in step S15), the control section 16 waits reception of entry of a payment request at the data input section 11 by the waiter (step S16). Upon reception of the entry of the payment request, the control section 16 makes the small printer 12 print out the receipt based on the order entry data in accordance with the receipt processing program 23 which will later be described with reference to FIG. 11 (step S30).

Figure 10:
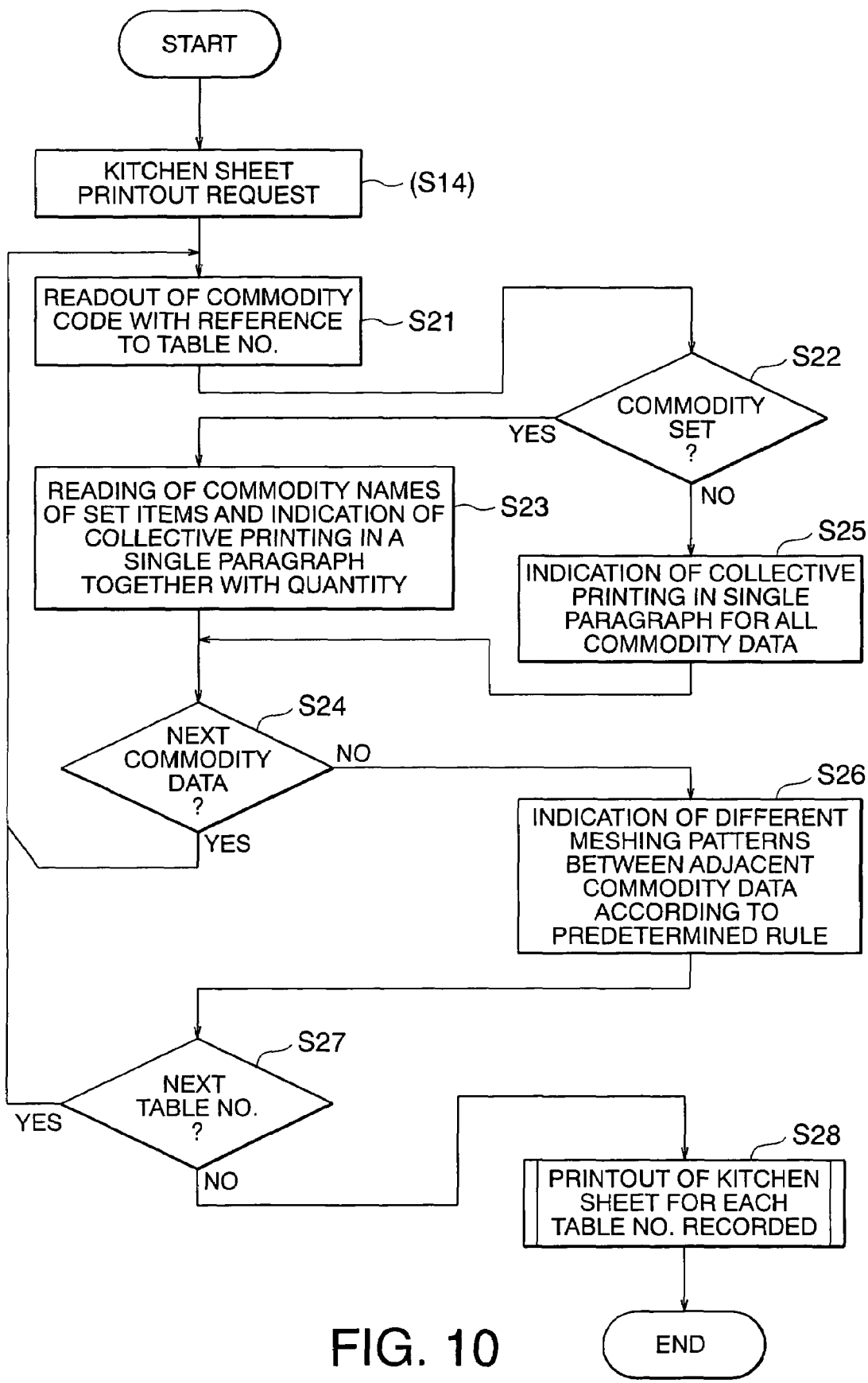
FIG. 10 is a flow chart for describing a kitchen sheet printout step in FIG. 9.

Next referring to FIG. 10, description will be made of the kitchen sheet printout step S20 in FIG. 9 in accordance with the kitchen sheet processing program 24. As described above, the kitchen printer 12k is installed in the kitchen and the kitchen sheet is printed out by the kitchen printer 12k upon order entry.

In case where no next data are received by the data input section 11 upon completion of the step S13 of recording the order entry data (NO in step S14), the control section 16 of the register judges occurrence of a kitchen sheet printout request and reads one commodity code from the order entry data table 22 with reference to the table number as the customer number (step S21).

In case where the commodity item corresponding to the commodity code read out is a commodity set (YES in step S22), the control section 16 reads commodity names of the individual set items contained in the commodity set from the commodity data table 21 and makes the printer data temporary memory 17 record, as kitchen sheet data, the commodity data (the commodity name, the quantity, and the customer number) with an indication of collective printing in a single paragraph (step S23).

Subsequently, the control section 16 checks the order entry data table 22 with reference to the same table number. In presence of next commodity data (YES in step S24), the operation returns to the step S21 to repeat the above-mentioned steps.

In case where the commodity item corresponding to the commodity code read out is not a commodity set (NO in step S22), the control section 16 makes the printer data temporary memory 17 record the commodity data with an indication of collective printing in a single paragraph together with other commodity items simultaneously ordered for the same table number (step S25). The operation is followed by the step S24.

In absence of next commodity data in the order entry data table 22 for the same table number (NO in step S22), the control section 16 makes the printer data temporary memory 17 record, as kitchen sheet data, the commodity data with an indication of meshing patterns so that adjacent ones of commodity data are printed with meshing patterns different from each other in accordance with a predetermined rule (step S26). Then, the control section 16 checks the order entry data table 22. If a next table number is present (YES in step S27), the operation returns to the step S22 to repeat the steps from readout of the commodity data.

In absence of a next table number (NO in step S27), the control section 16 sends the kitchen sheet data stored in the printer data temporary memory 17 to the kitchen printer 12k for each table number and requests printout. The kitchen printer 12k prepares and prints out the kitchen sheet as illustrated in FIG. 4 (step S28).

In the foregoing description, the orders for all table numbers recorded are collectively successively printed out. Alternatively, the orders may be successively printed out per each table number.

Figure 11:
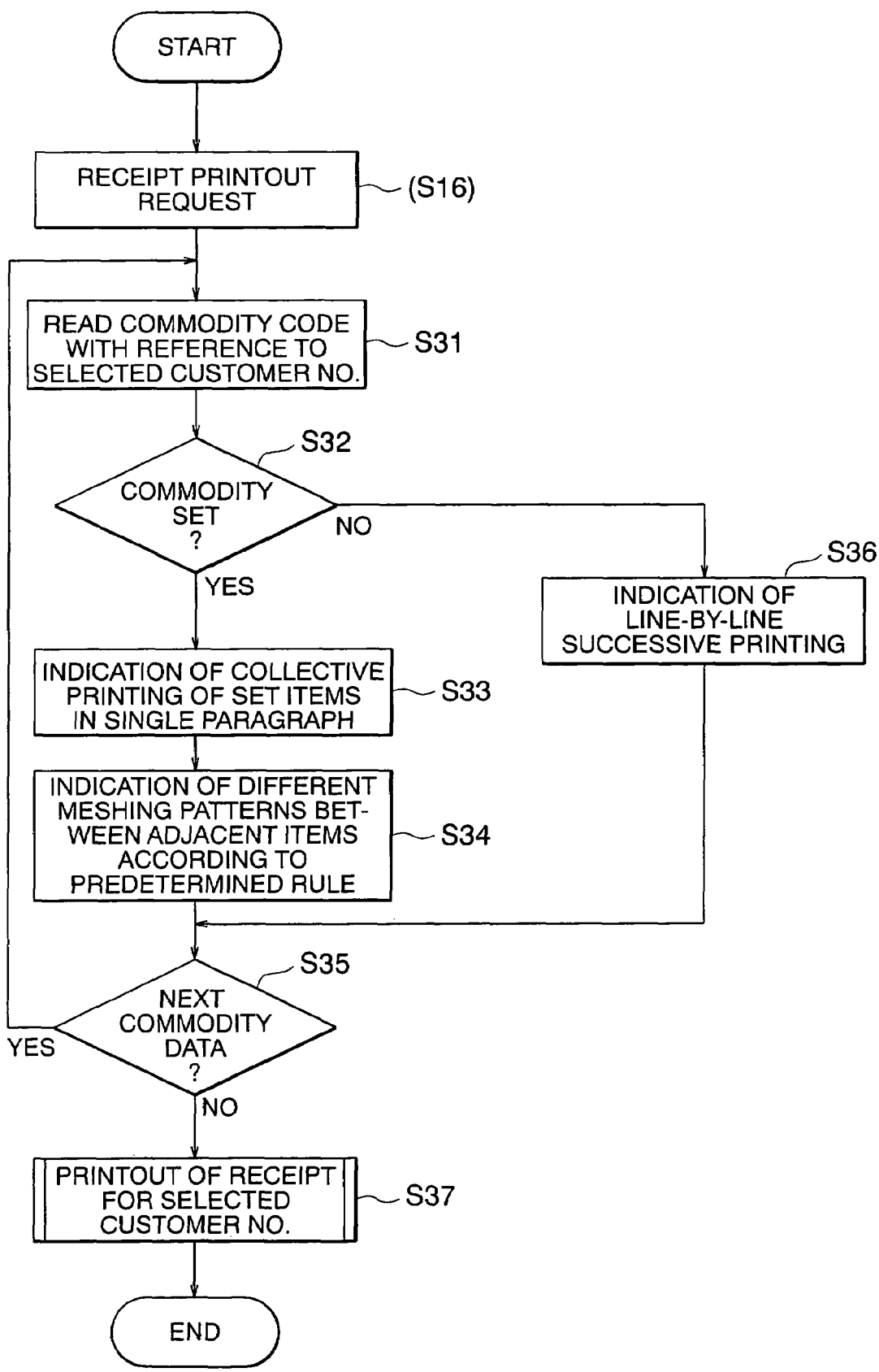
FIG. 11 is a flow chart for describing a receipt printout step in FIG. 9.

Next referring to FIG. 11, description will be made of the receipt printout step S30 in FIG. 9 in accordance with the receipt processing program 23. The small printer 12 is installed in the register at the entrance of the restaurant. Upon payment, the receipt is printed out from the small printer 12.

The control section 16 of the register judges occurrence of a receipt printout request upon reception of input of the payment request from the data input section 11 in the step S16 and reads one commodity code from the order entry data table 22 with reference to the table number as the customer number (step S31).

In case where the commodity item corresponding to the commodity code read out is a commodity set (YES in step S32), the control section 16 reads commodity names of the individual set items contained in the commodity set from the commodity data table 21 and makes the printer data temporary memory 17 record, as receipt data, the commodity data (the commodity name, the quantity, and the customer number) with an indication of collective printing in a single paragraph (step S33). Then, the control section 16 makes the printer data temporary memory 17 record the indication of meshing patterns so that adjacent ones of the set items are printed with meshing patterns different from each other in accordance with the predetermined rule (step S34).

Subsequently, the control section 16 checks the order entry data table 22 with reference to the same customer number. In presence of next commodity data (YES in step S35), the operation returns to the step S31 to repeat the above-mentioned steps.

In case where the commodity item corresponding to the commodity code read out is not a commodity set (NO in step S32), the control section 16 makes the printer data temporary memory 17 record, as receipt data, the commodity data with an indication of successive printing such that the commodity data are printed in a next line by feeding a line and changing a paragraph from other commodity items simultaneously ordered for the same customer number (step S36). The step 36 is followed by the step S35.

In absence of next commodity data in the order entry data table 22 for the same customer number (NO in step S35), the control section 16 sends the receipt data stored in the printer data temporary memory 17 to the small printer 12 for each customer number and requests printout. The small printer 12 prepares and prints out the receipt as illustrated in FIG. 3 (step S37).

In the foregoing description, the table number is used as the customer number. Actually, however, different and independent customers may be seated at a same table. Therefore, the customer number and the table number are used in combination in the order entry data table. For example, the customer number may be a number comprising a combination of a date and the order of reception.

Thus, adjacent ones of commodity data are printed in monochromic meshing patterns different from each other. Accordingly, it is possible to easily confirm and recognize the commodity data on the receipt or the kitchen sheet without increasing the printing cost required for the printer, the printer ink, the print sheet, and so on.

Fifth Embodiment

Figure 12:
FIG. 12 is a view showing a receipt according to a fifth embodiment of this invention.
Figure 12:
Figure 12:
Figure 12:
Figure 12:

Referring to FIG. 12, a receipt 5 according to a fifth embodiment of this invention will be described.

In the receipt 5 illustrated in FIG. 12, each line including a combination of the commodity name and the price corresponding to each individual commodity item is meshed. In this case, adjacent meshing patterns are different from each other. Thus, the receipt easy to confirm is produced.

Sixth Embodiment

Referring to FIG. 13, a receipt 6 according to a sixth embodiment of this invention will be described.

In the receipt 6 illustrated in FIG. 13, meshing patterns are printed simply on every other line. Thus, the receipt easy to confirm is produced.

Other Embodiments

In the embodiments described above, the monochromic small printer is used. However, it is possible to print meshed portions in different colors corresponding to the types of the meshing patterns by the use of a color printer having a polychromic printing function.

Further, coloration may be used in addition to the meshing patterns or a combination of the meshing patterns and coloration may be used. In this event, the data may be printed with background colors changed line by line. Therefore, not only the data but also classification of data groups can easily be recognized.

In case where the color printer is used and polychromic printing is combined with the meshing patterns, the cost of the printer and the ink is increased but easy identification or easy recognition is remarkably improved. Thus, improvement of easy recognition and the reduction in cost of the print sheet provide a remarkable advantage far outweighing the increase in cost for the color printer used as the small printer.

With the data printing method using a small printer and the commodity data register according to this invention, the commodity data are printed on the print sheet in an easily recognizable manner by the use of a small printer capable of printing character data with a plurality of types of meshing patterns in a monochromic mode. It is therefore possible to reduce the cost as compared with the use of a color printer.

In order to enable easy recognition, the commodity data are generally printed using line feed and paragraph separation. In this invention, a plurality of data items are continuously printed in a single paragraph over a plurality of lines without feeding or changing lines and adjacent ones of data items are provided with meshing patterns different from each other. In this manner, consumption of the print sheet is saved and the running cost is reduced.

By the use of a color printer, the meshing patterns may be replaced by a plurality of colors. A combination of the meshing patterns and coloration as auxiliary marking realizes remarkable improvement in easy recognition. In this invention, instead of the printing using line feed and paragraph separation to improve easy recognition, a number of data items are continuously printed in a single paragraph over a plurality of lines without changing lines item by item but are easily recognizable. This invention is applicable to various kinds of usage which essentially and indispensably require easy identification of individual data items.

The data printing method according to this invention is applicable not only to commodity data and to the print sheet of a narrow width but also to printing of a list of various kinds of data by a general-purpose printer and enables the data to be arranged in an easily recognizable manner by the use of meshing patterns, colors, and a combination thereof.

While this invention has thus far been described in conjunction with the preferred embodiments thereof, it will be readily possible for those skilled in the art to put this invention into practice in various other manners without departing from the scope of this invention.

What is claimed is:

1. A data printing method of printing a plurality of visually perceptible commodity data items, each comprising a name of an object, on a print sheet by a printer which has a function for printing a plurality of types of meshing patterns, wherein said method comprises printing said plurality of visually perceptible commodity data items such that the visually perceptible commodity data items are easily identified when printed and so that adjacent ones of said commodity data items are covered with the meshing patterns different from each other.

2. A data printing method according to claim 1, wherein said printer has a function for printing said plurality of types of meshing patterns in a monochromic mode.

3. A data printing method according to claim 1, said plurality of data commodity items forming a group, wherein said printing step is carried out so that said visually perceptible plurality of commodity data items are continuously printed in a single paragraph over one or more lines without changing lines item by item.

4. A data printing method according to claim 1, wherein said printing step is carried out so that the adjacent ones of said plurality of visually perceptible commodity data items are printed with the meshing patterns different from each other on every other line.

5. A data printing method according to claim 1, wherein said printer is a color printer for carrying out a printing in a polychromic mode, said printing step being carried out so that color information is added to at least one of said plurality of visually perceptible commodity data items and said meshing patterns by polychromic printing.

6. A data printing method of printing a plurality of visually perceptible commodity data items, each comprising a name of an object, on a print sheet by a printer which has a function for printing said plurality of visually perceptible commodity data items with colors, wherein said method comprises printing said visually perceptible plurality of commodity data items such that the visually perceptible commodity data items are easily identified when printed and so that adjacent ones of said commodity data items are continuously printed in each line of said print sheet with the colors different from each other.

7. A data printing method of printing a plurality of visually perceptible commodity data items, each comprising a name of an object, on a print sheet by a printer which has a function for printing said plurality of visually perceptible commodity data items covered with meshing patterns, wherein said method comprises printing said plurality of visually perceptible commodity data items such that the visually perceptible commodity data items are easily identified when printed and so that adjacent ones of said data items are continuously printed in each line of said print sheet and covered with the meshing patterns different from each other.

8. A commodity data register having a printer for printing a commodity name of a commodity item as commodity data on a print sheet, said data register comprising:

said printer adapted to print a plurality of types of meshing patterns;

a data input section for entering the name of the commodity item as the commodity data;

a commodity data table preliminarily recording and storing a commodity code, a commodity name, and a unit price for each commodity item to be handled;

an order entry data table recording and storing a customer number, the commodity name and the quantity of the commodity item, and a total price based on the commodity data supplied from the data input section;

a processing program storing section for preliminarily setting a meshing pattern rule for the order of printing of the commodity data and preliminarily recording and storing a printing procedure for each type of a print sheet; and a control section connected to said printer, said data input section, said commodity data table, said order entry data table, and said processing program storing section, said control section being for executing an order entry data storing operation and a printout requesting operation;

said order entry data storing operation comprising:

receiving from said data input section the commodity data comprising the customer number and the commodity code and the quantity of each commodity item;

referring to said commodity data table to read the commodity name and the unit price;

calculating the total price; and making said order entry data table record and store said commodity data as order entry data;

said printout requesting operation comprising:

receiving from said data input section a printout request with the customer number;

acquiring the commodity data corresponding to the customer number from said order entry data table; and requesting the printer to print the commodity data with meshing patterns in accordance with the predetermined rule;

said printer printing the commodity data on said print sheet in the printout requesting operation in a manner such that adjacent ones of commodity data are printed with meshing patterns different from each other in accordance with the predetermined rule.

9. A commodity data register according to claim 8, wherein said printer adapted to print a plurality of types of meshing patterns in a monochromic mode.

10. A commodity data register according to claim 8, wherein said printout requesting operation comprises an operation of continuously printing a plurality of commodity data forming a group over one or more lines without changing lines item by item in a manner such that adjacent ones of commodity data are printed with meshing patterns different from each other.

11. A commodity data register according to claim 8, wherein said printer is a color printer adapted to perform polychromic printing and having means for printing adjacent ones of commodity data in an easily recognizable manner by providing characters and/or meshing patterns with color information in response to a request from said control section.

* * * * *